United States Patent
Nakamoto et al.

(10) Patent No.: US 12,186,866 B2
(45) Date of Patent: Jan. 7, 2025

(54) ELECTRIC TOOL SYSTEM, ELECTRIC TOOL, AND METHOD FOR MANAGING ELECTRIC TOOL

(71) Applicant: Panasonic Intellectual Property Management Co., Ltd., Osaka (JP)

(72) Inventors: Masanori Nakamoto, Mie (JP); Hiroaki Murakami, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 413 days.

(21) Appl. No.: 17/624,525

(22) PCT Filed: May 27, 2020

(86) PCT No.: PCT/JP2020/021020
§ 371 (c)(1),
(2) Date: Jan. 3, 2022

(87) PCT Pub. No.: WO2021/002125
PCT Pub. Date: Jan. 7, 2021

(65) Prior Publication Data
US 2022/0241943 A1    Aug. 4, 2022

(30) Foreign Application Priority Data
Jul. 4, 2019   (JP) ................. 2019-125507

(51) Int. Cl.
*B25B 23/147*   (2006.01)
*G05B 19/18*   (2006.01)

(52) U.S. Cl.
CPC ........ *B25B 23/1475* (2013.01); *G05B 19/182* (2013.01); *G05B 2219/35519* (2013.01)

(58) Field of Classification Search
CPC .... B25F 3/00; B25F 5/001; B25F 5/02; B25F 5/00; B25F 5/025; B25B 21/00;
(Continued)

(56) References Cited

U.S. PATENT DOCUMENTS

| 10,603,770 B2 * | 3/2020 | Huber ................. B25B 23/18 |
| 10,646,982 B2 * | 5/2020 | Dey, IV ............. B25B 23/1475 |
| 2014/0331829 A1 * | 11/2014 | King ................... G01L 25/003 81/467 |

FOREIGN PATENT DOCUMENTS

| DE | 10 2017 008859 | * 11/2018 |
| JP | 2005-351683 A | 12/2005 |
| JP | 2018-122429 A | 8/2018 |

OTHER PUBLICATIONS

International Search Report issued in corresponding International Patent Application PCT/JP2020/021020, dated Jul. 14, 2021, with English translation.

* cited by examiner

Primary Examiner — Robert J Scruggs
(74) Attorney, Agent, or Firm — Rimon P.C.

(57) ABSTRACT

An electric tool system includes an electric tool and an inspection device. The electric tool includes: a tightening unit configured to tighten a workpiece onto an attaching target by driving force of a drive source; and a sensor configured to measure a tightening torque provided by the tightening unit. The inspection device includes a measuring unit configured to measure tightening force applied from the tightening unit. The electric tool system further includes an association processor configured to associate a first torque measured value with a second torque measured value. The first torque measured value corresponds to a measurement result by the sensor. The second torque measured value corresponds to a measurement result by the measuring unit.

3 Claims, 10 Drawing Sheets

(58) Field of Classification Search
CPC ..... B25B 21/002; B25B 21/02; B25B 21/004;
B25B 21/008; B25B 23/14; B25B 23/141;
B25B 23/1415; B25B 23/147; B25B
23/1475; B25B 23/1462; B25B 23/1464;
G05B 19/182; G05B 19/418; G05B
2219/35519; G01L 25/00; G01L 25/003;
G01L 25/006; B25D 16/003; B25D
16/006

See application file for complete search history.

ELECTRIC TOOL SYSTEM, ELECTRIC TOOL, AND METHOD FOR MANAGING ELECTRIC TOOL

CROSS REFERENCE TO RELATED APPLICATIONS

This patent application is the U.S. National Phase under 35 U.S.C. § 371 of International Application No. PCT/JP2020/021020 filed on May 27, 2020, which claims the benefit of Japanese Patent Application No. 2019-125507, dated Jul. 4, 2019, the entire contents of each are hereby incorporated by reference in their entirety.

TECHNICAL FIELD

The present disclosure generally relates to electric tool systems, electric tools, and methods for managing electric tools and specifically relates to an electric tool system including an electric tool configured to measure a torque, the electric tool, and a method for managing the electric tool.

BACKGROUND ART

Patent Literature 1 discloses a tool system. The tool system includes a tool and a management apparatus.

The tool is used to work on a workpiece. The tool includes: a tightening unit configured to be driven by a drive source to tighten the workpiece onto an attaching target; a sensor configured to measure at least one of a vibration or a sound caused by the tightening unit; and an outputter configured to output a measurement result by the sensor.

The management apparatus is configured to manage the condition of the tool. The management apparatus is configured to determine, based on the measurement result output from the tool, the condition of the tool.

In the field of the electric tool, the reliability of a tightening torque value measured by the electric tool may be desirably improved.

CITATION LIST

Patent Literature

Patent Literature 1: JP 2018-122429 A

SUMMARY OF INVENTION

In view of the foregoing, it is an object of the present disclosure to provide an electric tool system that can improve the reliability of a tightening torque value measured by an electric tool, the electric tool included in the electric tool system, and a method for managing the electric tool.

An electric tool system according to an aspect of the present disclosure includes an electric tool and an inspection device. The electric tool includes: a tightening unit configured to tighten a workpiece onto an attaching target by driving force of a drive source; and a sensor configured to measure a tightening torque provided by the tightening unit. The inspection device includes a measuring unit configured to measure tightening force applied from the tightening unit. The electric tool system further includes an association processor configured to associate a first torque measured value with a second torque measured value. The first torque measured value corresponds to a measurement result by the sensor. The second torque measured value corresponds to a measurement result by the measuring unit.

An electric tool system according to an aspect of the present disclosure includes an electric tool and an inspection device. The electric tool includes: a tightening unit configured to tighten a workpiece onto an attaching target by driving force of a drive source; and a controller configured to control the tightening unit to adjust an output torque to be output from the tightening unit. The inspection device includes a measuring unit configured to measure tightening force applied from the tightening unit. The electric tool further includes a calibration processor configured to calibrate the controller in accordance with a measured value measured by the measuring unit of the inspection device.

An electric tool according to an aspect of the present disclosure is included in the electric tool system.

A method for managing an electric tool according to an aspect of the present disclosure is a management method of an electric tool including: a tightening unit configured to tighten a workpiece onto an attaching target by driving force of a drive source; and a sensor configured to measure a tightening torque provided by the tightening unit. The management method includes: a measurement step of measuring tightening force applied from the tightening unit; and an association step of associating a first torque measured value to a second torque measured value. The first torque measured value corresponds to a measurement result by the sensor. The second torque measured value corresponds to a measurement result in the measurement step.

A method for managing an electric tool according to an aspect of the present disclosure is a management method of an electric tool including: a tightening unit configured to tighten a workpiece onto an attaching target by driving force of a drive source; and a controller configured to control the tightening unit to adjust an output torque to be output from the tightening unit. The management method includes: a measurement step of measuring tightening force applied from the tightening unit; and a calibration step of calibrating the controller with reference to a measured value measured in the measurement step.

DESCRIPTION OF EMBODIMENTS

An electric tool system 10 according to an embodiment will be described below with reference to the accompanying drawings.

(1) Overview

Figure 1:
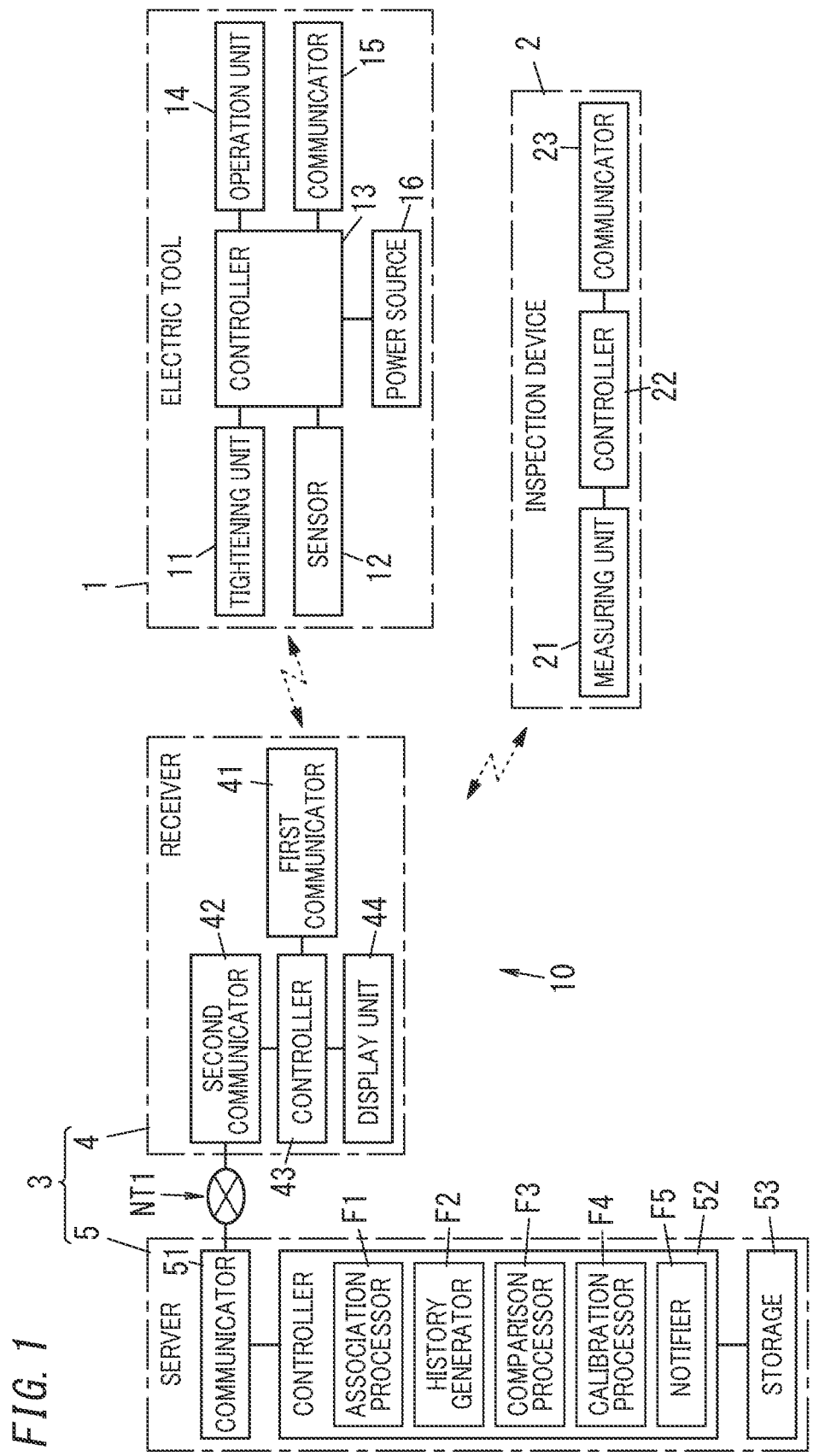
FIG. 1 is a block diagram of a schematic configuration of an electric tool system of an embodiment.
Figure 2:
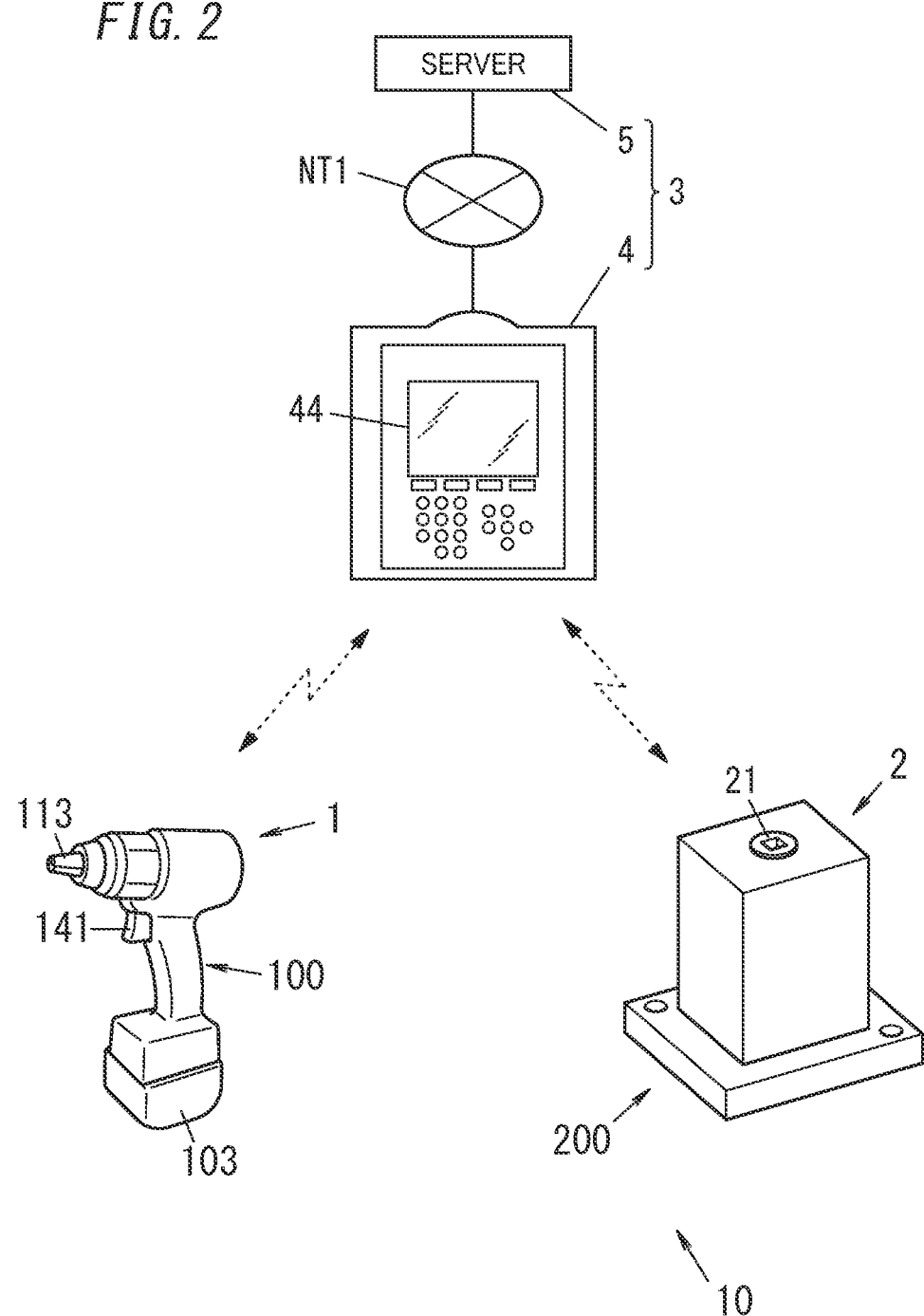
FIG. 2 is a schematic system configuration diagram of the electric tool system.

FIG. 1 is a schematic block diagram of the electric tool system 10. FIG. 2 is a schematic system configuration diagram of the electric tool system 10.

As shown in FIGS. 1 and 2, the electric tool system 10 includes an electric tool 1 and an inspection device 2. The electric tool system 10 further includes an association processor F1.

The electric tool 1 is a tool for business operators and is to be used in, for example, a factory or a construction site. The electric tool 1 is used to, for example, tighten a workpiece (e.g., a fastening member such as a bolt or a screw), thereby attaching an attachment target (e.g., a photovoltaic cell panel) to an attaching target (e.g., a mount). In this embodiment, the electric tool 1 is an electrically driven impact wrench configured to tighten a bolt or the like as the workpiece by rotating the bolt with an impact force. Note that the electric tool 1 is not limited to the electrically driven impact wrench but may be, for example, an electrically driven impact driver, or an electrically driven torque wrench or an electrically driven drill driver which applies no impact force.

As shown in FIG. 1, the electric tool 1 includes a tightening unit 11 and a sensor 12. The tightening unit 11 includes a motor 111 (see FIG. 3) as a drive source. The tightening unit 11 tightens a workpiece (fastening member) onto an attaching target by driving force of the motor 111. The sensor 12 measures a tightening torque provided by the tightening unit 11.

As shown in FIG. 1, the inspection device 2 includes a measuring unit 21. The measuring unit 21 measures tightening force applied from the tightening unit 11. The tightening force is force applied from the tightening unit 11 to the workpiece or a torque (applied tightening torque) given from the tightening unit 11 to the workpiece.

The association processor F1 associates a first torque measured value (tightening torque value) with a second torque measured value (an applied tightening torque value). The first torque measured value corresponds to a measurement result by the sensor 12. The second torque measured value corresponds to a measurement result by the measuring unit 21.

In the electric tool system 10, the association processor F1 associates the first torque measured value corresponding to the tightening torque measured by the sensor 12 of the electric tool 1 with the second torque measured value corresponding to the tightening force (applied tightening torque) measured by the measuring unit 21 of the inspection device 2. This enables the electric tool system 10 to grasp the condition of the electric tool 1 in detail. For example, when one of the sensor 12 of the electric tool 1 and the measuring unit 21 of the inspection device 2 can no longer measure a correct value due to age deterioration or the like, the electric tool system 10 can grasp the deterioration of the one unit. This enables the electric tool system 10 to perform a process, for example, calibration of one of the first torque measured value and the second torque measured value by using the other of the first torque measured value and the second torque measured value and to improve the reliability of the tightening torque value measured by the electric tool 1.

(2) Details

With reference to the drawings, the electric tool system 10 of the present embodiment will be described further in detail below.

As shown in FIG. 1, the electric tool system 10 further includes a management system 3 in addition to the electric tool 1 and the inspection device 2.

As shown in FIG. 1, the electric tool 1 includes a controller 13, an operation unit 14, a communicator 15, and a power source 16 in addition to the tightening unit 11 and the sensor 12. The electric tool 1 further includes a body 100 for housing or holding the components.

Figure 3:
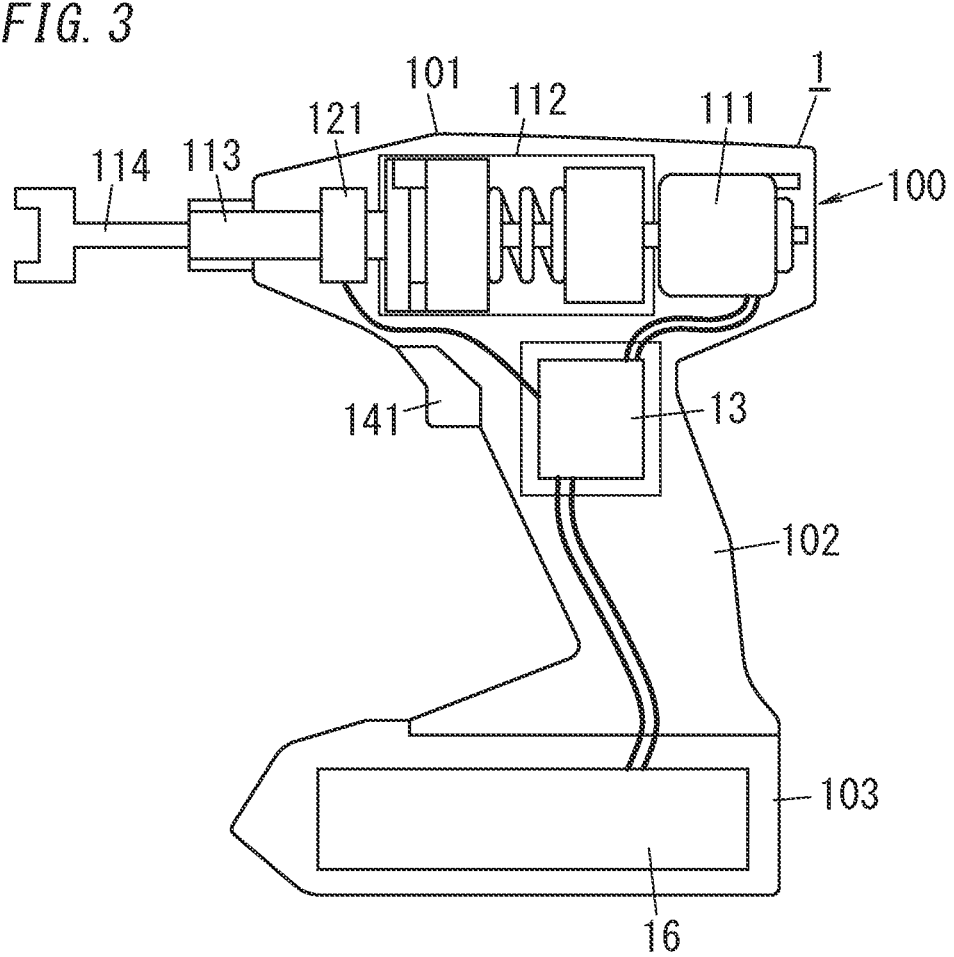
FIG. 3 is a schematic view of an example of an electric tool included in the electric tool system.

As shown in FIG. 3, the body 100 of the electric tool 1 includes a body part 101 which is tubular and a grip part 102 radially protruding from a peripheral surface of the body part 101. An output shaft 113 protrudes from one end in an axial direction of the body part 101. The output shaft 113 is provided with a socket 114 (chuck). To the socket 114, a bit (e.g., a torque wrench bit) adopted to a fastening component as a workpiece is to be detachably attached. The grip part 102 has one end (lower end in FIG. 3) to which a battery pack 103 housing the power source 16 is to be detachably attached.

The controller 13 controls operation of the tightening unit 11, the sensor 12, the communicator 15, and the like. The controller 13 includes, for example, a microcontroller having one or more processors and memory. In other words, the controller 13 is implemented as a computer system including one or more processors and memory. The computer system functions as the controller 13 by making the one or more processors execute a program stored in the memory. In this embodiment, the program is stored in advance in the memory of the controller 13. However, this is only an example and should not be construed as limiting. The program may also be downloaded via a telecommunications network such as the Internet or may be distributed after having been stored in a non-transitory storage medium such as a memory card. The controller 13 may include, for example, a Field-Programmable Gate Array (FPGA), an Application Specific Integrated Circuit (ASIC), and the like. The microcontroller (e.g., a circuit board) included in the controller 13 is housed in the interior of the grip part 102.

The operation unit 14 includes a trigger switch 141 provided to the grip part 102. When the trigger switch 141 receives an operation given by a user or the like, the controller 13 receives an operation signal whose magnitude is proportional to the pull-in amount of the trigger switch 141 (the manipulative variable indicating how deep the trigger switch 141 has been pulled). The controller 13 adjusts the speed of the motor 111 such that the motor 111 rotates at a speed according to the operation signal received from the operation unit 14.

The tightening unit 11 includes a drive circuit (not shown), an impact mechanism 112, and the output shaft 113 in addition to the motor 111. The drive circuit controls the rotation of the motor 111 in accordance with a control signal received from the controller 13. The rotation of the output shaft of the motor 111 is transmitted via the impact mechanism 112 to the output shaft 113. When an output torque is less than or equal to a prescribed level, the impact mechanism 112 reduces the speed of rotation of the output shaft of the motor 111 and then transmits the rotation to the output shaft 113. The impact mechanism 112 is configured to, when the output torque exceeds the prescribed level, apply impact force to the output shaft 113 to rotate the fastening component (e.g., a bolt), which is the workpiece. As shown in FIG. 3, the motor 111 and the impact mechanism 112 are housed in the body part 101.

The sensor 12 measures the tightening torque provided by the tightening unit 11. The sensor 12 includes a magnetostrictive torque sensor 121 attached to the output shaft 113. The magnetostrictive torque sensor 121 detects, with a coil provided in a non-rotating portion, a variation in permeability corresponding to a strain caused by the application of a torque to the output shaft of the motor 111 and outputs a voltage signal, of which the magnitude is proportional to the magnitude of the strain. Thus, the sensor 12 measures the torque provided to the output shaft 113. That is, the sensor 12 measures the torque (the tightening torque) that the electric tool 1 provides to the workpiece. The sensor 12 transmits the torque (the tightening torque) thus measured to the controller 13.

The controller 13 controls the tightening unit 11 such that the value of the tightening torque becomes a torque set value. The controller 13 stops the rotation of the motor 111, for example, when the tightening torque measured by the magnetostrictive torque sensor 121 reaches the torque set value. The electric tool 1 may include a torque setting section configured to variably set the torque set value.

The communicator 15 is a communication module which performs wireless communication using a radio wave as a medium. The communicator 15 is configured to perform near field communication based on a communication scheme compliant with, for example, the standard of Bluetooth (registered trademark) Low Energy (BLE). "BLE" is the name of a low power consumption specification in the specification of Bluetooth (registered trademark), which is a wireless Personal Area Network (PAN) technology. Note that the communication scheme of the communicator 15 is not limited to BLE but may be a communication scheme such as ZigBee (registered trademark) as long as the communication scheme requires no license of a wireless station. The communicator 15 wirelessly communicates with a receiver 4 (which will be described later) of the management system 3 in this embodiment.

The controller 13 transmits a first measurement signal via the communicator 15 to the receiver 4. In this embodiment, the first measurement signal is a signal representing the first torque measured value corresponding to the magnitude of the tightening torque measured by the sensor 12. When the operation unit 14 (the trigger switch 141) is receiving an operation, in other words, when the motor 111 rotates and the output shaft 113 outputs a torque, the controller 13 may transmit the first measurement signal to the management system 3 in real time. The first torque measured value represented by the first measurement signal transmitted from the electric tool 1 may include a measured value in the case of working where the electric tool 1 works on the workpiece, and the first torque measured value may include a measured value in the case of inspection where the electric tool 1 is under inspection by the inspection device 2. Note that "real time" as used in the present disclosure is not limited to exactly immediate data processing but allows for a delay time caused e.g., by a measurement/inevitable error.

The power source 16 includes a storage battery. The power source 16 is housed in the battery pack 103. The battery pack 103 includes the power source 16 housed in a case made of a resin. The battery pack 103 is detached from the grip part 102, and the battery pack 103 thus detached is connected to a charger, thereby charging the storage battery of the power source 16. The power source 16 supplies electric power charged in the storage battery as electric power necessary for operation of an electric circuit including the controller 13 and the motor 111.

The inspection device 2 is a device for inspecting the electric tool 1 for normal operation. The inspection device 2 measures the tightening force applied from the tightening unit 11 of the electric tool 1 so as to inspect the electric tool 1. As shown in FIG. 1, the inspection device 2 includes a controller 22 and a communicator 23 in addition to the measuring unit 21. Moreover, the inspection device 2 includes a housing 200 for housing or holding the components.

Figure 4:
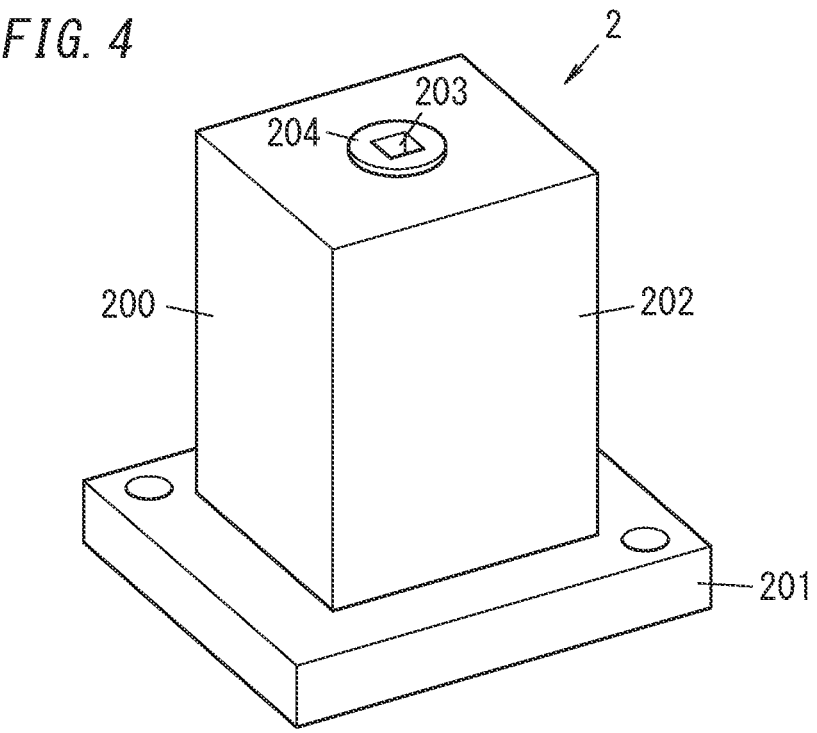
FIG. 4 is a schematic view of an example of an inspection device included in the electric tool system.

As shown in FIG. 4, the housing 200 of the inspection device 2 includes a base 201 and a body 202.

The base 201 is a member for mounting and/or fixing the inspection device 20 at a desired location of a desk, a wall, or the like. The base 201 has a rectangular plate shape. The base 201 has two through holes through which screws for fixation are to be inserted. Note that the inspection device 2 does not have to include the base 201.

The body 202 is disposed on an upper surface of the base 201 integrally with the base 201. The body 202 has a rectangular box shape in this embodiment. However, the shape of the body 202 is not particularly limited but may have other shapes, such as a cylindrical shape. The body 202 is provided with a gauging member 204. The gauging member 204 has an upper surface having an insertion hole 203 into which a bit of the electric tool 1 is to be inserted.

The measuring unit 21 includes the gauging member 204. When the electric tool 1 is driven (the motor 111 is rotated) with the bit of the electric tool 1 being inserted in the insertion hole 203, the measuring unit 21 measures force (tightening force) which the gauging member 204 receives from the bit. When the electric tool 1 includes an impact mechanism, the measuring unit 21 senses, as the tightening force, reactive force of the impact force per impact by the impact mechanism of the electric tool 1. The measuring unit 21 includes, for example, a strain gauge for measuring a strain generated at the gauging member 204. The measuring unit 21 measures, based on a measurement result by the strain gauge, the tightening force received from the electric tool 1. Note that the measurement method of the tightening force by the measuring unit 21 is not limited to the method by using the strain gauge but may be any appropriate method such as a magnetostrictive-based method.

The controller 22 controls operation of the measuring unit 21, the communicator 23, and the like. The controller 22 includes, for example, a microcontroller having one or more processors and memory. The controller 22 may include, for example, a Field-Programmable Gate Array (FPGA), an Application Specific Integrated Circuit (ASIC), and the like.

The communicator 23 is a communication module configured to perform near field communication based on the same communication scheme as the communication scheme of the communicator 15 of the electric tool 1. The communicator 23 wirelessly communicates with the receiver 4 of the management system 3 in this embodiment.

The controller 22 transmits a second measurement signal via the communicator 23 to the receiver 4. In this embodiment, the second measurement signal is a signal representing the second torque measured value corresponding to the magnitude of the applied tightening torque obtained from the tightening force measured by the measuring unit 21. The second torque measured value is calculated by the controller 22 with reference to the tightening force measured by the measuring unit 21. When the measuring unit 21 is measuring the tightening force, that is, during the inspection of the electric tool 1, the controller 22 may transmit the second measurement signal to the management system 3 in real time.

As shown in FIG. 1, the management system 3 includes the receiver 4 and a server 5.

The receiver 4 includes a first communicator 41, a second communicator 42, a controller 43, and a display unit 44.

The controller 43 controls operation of the first communicator 41, the second communicator 42, the display unit 44, and the like. The controller 43 includes, for example, a microcontroller having one or more processors and memory. The controller 43 may include, for example, a Field-Programmable Gate Array (FPGA), an Application Specific Integrated Circuit (ASIC), and the like.

The display unit 44 includes, for example, a display device such as a liquid crystal display or an organic Electro-Luminescence (EL) display. The display unit 44 is controlled by the controller 43 to display the first torque measured value represented by the first measurement signal transmitted from the electric tool 1, display the second torque measured value represented by the second measurement signal transmitted from the inspection device 2, and the like.

The first communicator 41 is a communication module configured to perform near field communication based on the same communication scheme as the communication scheme of the communicator 15 of the electric tool 1 and the communicator 23 of the inspection device 2. In this embodiment, the first communicator 41 communicates with the electric tool 1 and the inspection device 2.

The second communicator 42 is a communication module configured to perform wired communication via a communication line. The second communicator 42 is connected to, for example, a wide-area communication network NT1, such as the Internet, via a router. The second communicator 42 has a communication function of communicating with the server 5 via the wide-area communication network NT1.

The controller 43 receives the first measurement signal via the first communicator 41 from the electric tool 1. When receiving the first measurement signal, the controller 43 associates the first torque measured value represented by the first measurement signal with a time of receiving the first measurement signal, and the controller 43 stores the first torque measured value in its built-in memory. It should be noted that the time of receiving the first measurement signal substantially corresponds to a time (measurement time) at which the tightening torque, corresponding to the first torque measured value represented by the first measurement signal, is measured by the sensor 12 of the electric tool 1. That is, the controller 43 stores the first torque measured value, which corresponds to the tightening torque measured by the sensor 12 of the electric tool 1, in association with the measurement time.

Moreover, the controller 43 receives the second measurement signal via the first communicator 41 from the inspection device 2. When receiving the second measurement signal, the controller 43 associates the second torque measured value represented by the second measurement signal with a time of receiving the second measurement signal, and the controller 43 stores the second torque measured value in its built-in memory. The time of receiving the second measurement signal substantially corresponds to a time (measurement time) at which the tightening force, corresponding to the second torque measured value represented by the second measurement signal, is measured by the measuring unit 21 of the inspection device 2. That is, the controller 43 stores the second torque measured value, which corresponds to the tightening force measured by the measuring unit 21 of the inspection device 2, in association with the measurement time.

The controller 43 transmits the first torque measured value and second torque measured value thus received, together with the respective measurement times associated with the first torque measured value and second torque measured value, via the second communicator 42 to the server 5.

The server 5 includes a communicator 51, a controller 52, and a storage 53.

The communicator 51 is a communication module configured to perform wired communication via a communication line. The communicator 51 is connected to, for example, the wide-area communication network NT1, such as the Internet, via a router. The communicator 51 has a communication function of communicating with the receiver 4 via the wide-area communication network NT1.

The controller 52 includes, for example, a microcontroller having one or more processors and memory. The controller 52 may include, for example, a Field-Programmable Gate Array (FPGA), an Application Specific Integrated Circuit (ASIC), and the like. The controller 52 controls operation of the communicator 51, and the like. Moreover, the controller 52 implements functions as the association processor F1, a history generator F2, a comparison processor F3, a calibration processor F4, and a notifier F5.

The storage 53 is a device for storing information. The storage 53 is, for example, Read Only Memory (ROM), Random Access Memory (RAM), or Electrically Erasable Programmable Read Only Memory (EEPROM).

The controller 52 stores the first torque measured value and the second torque measured value transmitted from the receiver 4 in the storage 53 in time sequence. In this embodiment, the controller 52 performs an association process of associating, based on the respective measurement times associated with the first torque measured value and the second torque measured value, the first torque measured value and the second torque measured value transmitted from the receiver 4 with each other. More specifically, if the time (measurement time) associated with a first torque measured value is the same as the time (measurement time) associated with a second torque measured value, the controller 52 determines that this first torque measured value (tightening torque) and this second torque measured value (tightening force) are values measured at the same time. Then, the controller 52 deems that the first torque measured value and the second torque measured value whose measurement times are the same respectively represent the torque (the tightening torque) output from the electric tool 1 and the torque (applied tightening torque) received from the electric tool 1 at the same time, and the controller 52 associates this first torque measured value and this second torque measured value with each other. The controller 52 stores the first torque measured value and the second torque measured value thus associated with each other in the storage 53 in time sequence. Note that "measurement times are the same" is not limited to a case where the measurement time corresponding to the first torque measured value is exactly the same as the measurement time corresponding to the second torque measured value but may be differ therefrom due to e.g., a measurement/inevitable error.

That is, the controller 52 includes the association processor F1 configured to associate the first torque measured value with the second torque measured value. The first torque measured value corresponds to the measurement result by the sensor 12. The second torque measured value corresponds to the measurement result by the measuring unit 21. In the electric tool system 10 of the present embodiment, the association processor F1 is provided in the management system 3 separated from the electric tool 1 and the inspection device 2 and configured to communicate with at least one of (in this embodiment, both of) the electric tool 1 or (and) the inspection device 2.

Moreover, it may be said that the controller 52 includes the history generator F2 configured to generate an inspection history with the second torque measured value being associated with the first torque measured value in time sequence. Moreover, the controller 52 also stores the first torque measured value obtained when the electric tool 1 works on the workpiece. Thus, it may be said that the controller 52 (the history generator F2) associates the history of use (the first torque measured value) of the electric tool 1 with the inspection history. The inspection history thus generated and the history of use are stored in the storage 53. Note that the electric tool 1 may include an identification information uniquely allocated to the electric tool 1 into the first measurement signal and then transmit the first measurement signal. In this case, the controller 52 may store, in the storage 53, the inspection history and the history of use in association with the identification information.

The controller 52 further makes a comparison between the first torque measured value and the second torque measured value which are associated with each other to the same time. It should be noted that the first torque measured value and the second torque measured value measured at the same time are measured values which are the same in terms of the target of measurement though measured by different subjects and which are obtained by measuring substantially the same physical quantity (torque). Thus, if one of the electric tool 1 (e.g., the sensor 12) and the inspection device 2 (e.g., the measuring unit 21) has no defect such as a failure or age deterioration, the first torque measured value and the second torque measured value represent substantially the same value. Thus, the controller 52 makes the comparison between the first torque measured value and the second torque measured value, thereby determining whether or not one of the electric tool 1 and the inspection device 2 has a failure. Thus, the controller 52 has the comparison processor F3 configured to make the comparison between the first torque measured value and the second torque measured value. Note that in order to secure that the first torque measured value and the second torque measured value have the same value, the electric tool 1 is preferably calibrated in an initial stage of use of the electric tool 1 such that the first torque measured value is equal to the second torque measured value.

When based on a result of the comparison between the first torque measured value and the second torque measured value measured at the same time, the first torque measured value and the second torque measured value satisfy a prescribed relationship, the controller 52 causes the electric tool 1 or the inspection device 2 to perform calibration of the measured value. For example, when a difference $\Delta T$ between the first torque measured value and the second torque measured value exceeds a prescribed first threshold $\Delta Th$, the controller 52 causes the electric tool 1 or the inspection device 2 to perform the calibration. In sum, the controller 52 further includes the calibration processor F4 configured to calibrate, based on a result of the comparison made by the comparison processor F3, the electric tool 1 or the inspection device 2 such that the difference $\Delta T$ between the first torque measured value and the second torque measured value decreases.

Here, frequency of use is, in general, significantly different between the electric tool 1 and the inspection device 2, and the frequency of use of the electric tool 1 is higher than that of the inspection device 2. Thus, a defect such as age deterioration is more likely to occur in the electric tool 1 than in the inspection device 2. Thus, if the first torque measured value is different from the second torque measured value, the controller 52 basically determines that the second torque measured value based on the measured value of the inspection device 2 is correct, and the controller 52 causes the electric tool 1 to perform the calibration such that the first torque measured value approximates the second torque measured value.

Figure 5:
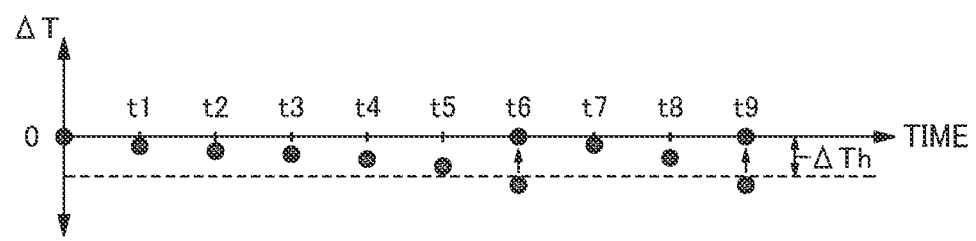
FIG. 5 is a view illustrating an example of operation of the electric tool system.

With reference to FIG. 5, an example of the calibration of the electric tool 1 by the electric tool system 10 will be described. In FIG. 5, the ordinate represents the difference $\Delta T$ obtained by subtracting the first torque measured value from the second torque measured value, and the abscissa represents the time.

For example, a user regularly or irregularly (time points t1 to t9 in FIG. 5) performs inspection (measurement of the second torque measured value) of the electric tool 1 by using the inspection device 2 at a timing other than a timing at which the electric tool 1 performs a normal process. Examples of the inspection of the electric tool 1 include inspection in which in a state where the electric tool 1 is driven with a bit of the electric tool 1 being inserted in the insertion hole 203 of the inspection device 2, the first torque measured value and the second torque measured value are measured, and the comparison between the first torque measured value and the second torque measured value thus measured is made. Note that an interval at which the user performs the inspection of the electric tool 1 is not particularly limited but is, for example, about several days to about several months.

When the user performs the inspection of the electric tool 1 by using the inspection device 2, the first torque measured value and the second torque measured value obtained at that time are transmitted via the receiver 4 to the server 5. The controller 52 of the server 5 makes the comparison between the first torque measured value and the second torque measured value. Based on the result of the comparison between the first torque measured value and the second torque measured value, the controller 52 determines whether or not the electric tool 1 has to be calibrated.

In the example shown in FIG. 5, the magnitude of the difference $\Delta T$ is smaller than the first threshold $\Delta Th$ from the time points t1 to t5. Thus, the controller 52 determines that the difference between the first torque measured value and the second torque measured value is small, and thus the calibration is unnecessary. In contrast, at the time point t6, the magnitude of the difference $\Delta T$ exceeds the first threshold $\Delta Th$. Thus, the controller 52 determines that the calibration is necessary.

In a specific example, it is assumed that the first threshold $\Delta Th$ is set to 15 N·m. At the time point t6, it is assumed that the first torque measured value is 120 N·m, and the second torque measured value is 100 N·m. In this case, the magnitude of the difference $\Delta T$ is greater than the first threshold $\Delta Th$, and therefore, the controller 52 determines that the electric tool 1 has to be calibrated. The controller 52 transmits from the communicator 51 a calibration instruction signal for causing the electric tool 1 to perform the calibration. The calibration instruction signal is, for example, a signal that instructs that the tightening torque value after the calibration is 100 N·m (the same value as the applied tightening torque value). When receiving the calibration instruction signal via the receiver 4, the controller 13 of the electric tool 1 recognizes that the current tightening torque value is not 120 N·m but 100 N·m. Then, the controller 13 of the electric tool 1 calibrates the sensor 12 such that the tightening torque measured by the sensor 12 corresponds to the tightening torque value (100 N·m) represented by the calibration instruction signal. Thus, the difference ΔT becomes 0.

Moreover, if in inspection thereafter, the magnitude of the difference ΔT exceeds the first threshold ΔTh (time point t9), the controller 52 transmits a calibration instruction signal to the electric tool 1 to cause the electric tool 1 to perform the calibration again.

The controller 52 further gives notification when based on a result of the comparison between the first torque measured value and the second torque measured value measured at the same time, the first torque measured value and the second torque measured value satisfy a prescribed relationship. For example, when the difference ΔT between the first torque measured value and the second torque measured value exceeds the prescribed second threshold, the controller 52 gives the notification. In sum, the controller 52 further includes the notifier F5 configured to perform the notification based on the result of the comparison made by the comparison processor F3. The second threshold may be less than the first threshold ΔTh. That is, the controller 52 may perform the notification by the notifier F5 before the calibration is performed by the calibration processor F4.

For the notification performed by the controller 52, any appropriate means may be used. For example, the controller 52 transmits a notification signal via the communicator 51 to the receiver 4, thereby displaying a desired message on the display unit 44 of the receiver 4. The content of the message may be a content indicating that the first torque measured value and the second torque measured value may be different from each other, that is, one of the first torque measured value and the second torque measured value may be different from a normal value, and therefore, one of the electric tool 1 and the inspection device 2 has to be calibrated. The content of the message does not have to directly indicate that the calibration is necessary but the content may be a content indicating that a timing at which the calibration is necessary is approaching.

A transmission destination to which the notifier F5 transmits the notification signal is not limited to the receiver 4 but may be the electric tool 1, the inspection device 2, or the like, or a device outside the electric tool system 10. Examples of the device outside the electric tool system 10 include an information terminal (a tablet computer, a smartphone, or the like) carried by a user of the electric tool 1. Moreover, a means for the notification is not limited to display of a message but any means such as light emission, vibration, or an auditory signal by an appropriate device may be used.

Note that when the total number of times of calibration of the electric tool 1 exceeds a prescribed threshold, the notifier F5 may give notification as a message for prompting a user to repair the electric tool 1.

Figure 6:
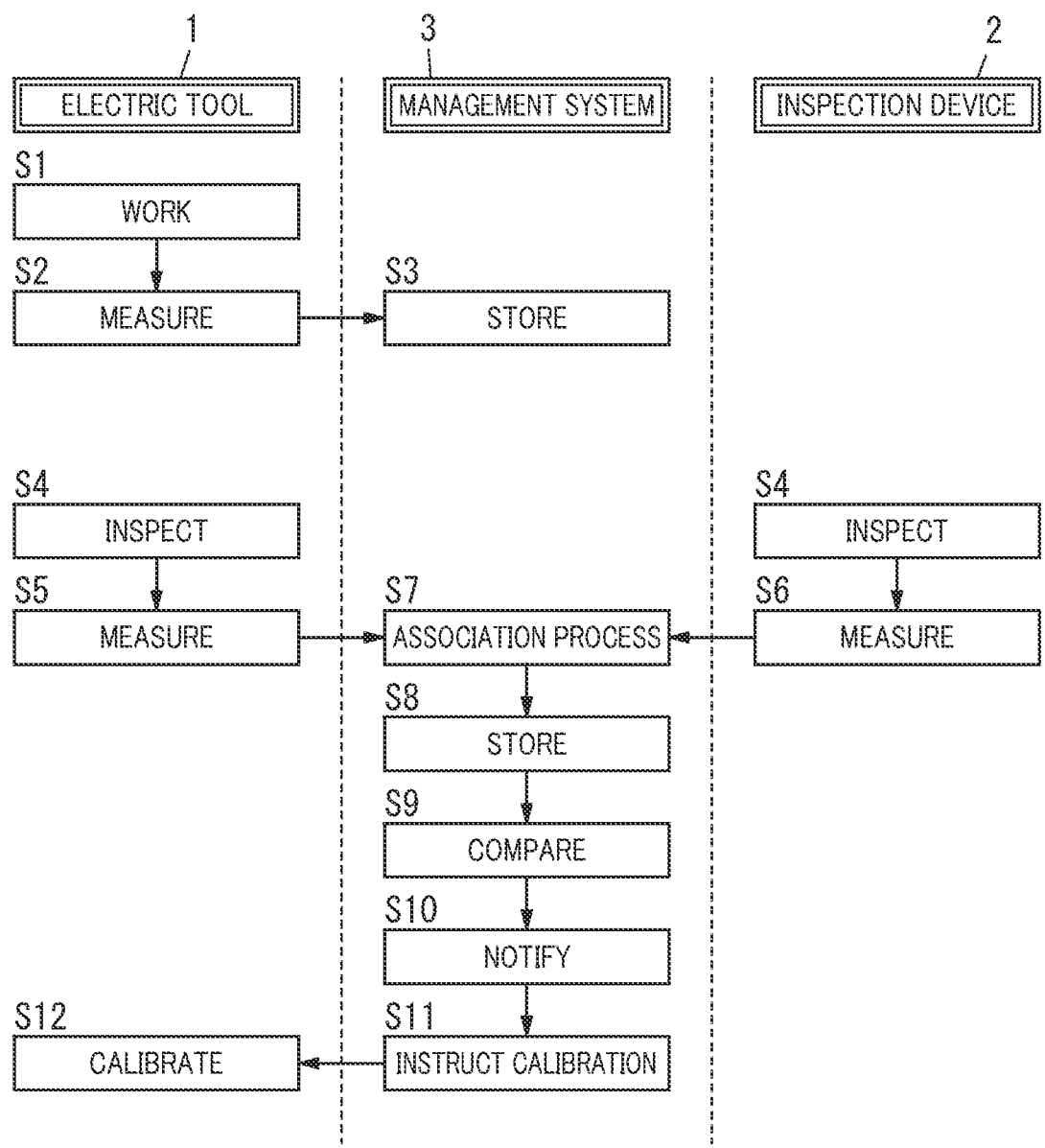
FIG. 6 is a flowchart illustrating the operation of the electric tool system.

Next, basic operation of the electric tool system 10 will be described with reference to FIG. 6.

When a user causes the electric tool 1 to operate so as to tighten a workpiece (S1), the sensor 12 measures a tightening torque and wirelessly transmits the first measurement signal representing the first torque measured value corresponding to the tightening torque thus measured to the management system 3 in real time (S2). When receiving the first measurement signal via the receiver 4, the server 5 of the management system 3 generates a history of use from the first torque measured value represented by the first measurement signal thus received and stores the history of use in the storage 53 (S3).

Moreover, when the inspection of the electric tool 1 is performed by the inspection device 2 (S4), the sensor 12 of the electric tool 1 measures the tightening torque (S5), and the measuring unit 21 of the inspection device 2 measures the tightening force (S6). The electric tool 1 wirelessly transmits the first measurement signal representing the first torque measured value corresponding to the tightening torque thus measured to the management system 3 in real time. The inspection device 2 wirelessly transmits the second measurement signal representing the second torque measured value corresponding to the tightening force thus measured to the management system 3 in real time. When receiving the first measurement signal and the second measurement signal via the receiver 4, the server 5 of the management system 3 associates the first torque measured value and the second torque measured value with each other based on, for example, the measurement times and the identification information on the electric tool 1 (S7), generates an inspection history, and stores the inspection history in the storage 53 (S8). The server 5 further makes a comparison between the first torque measured value and the second torque measured value associated with each other (S9). When the magnitude of the difference ΔT between the first torque measured value and the second torque measured value exceeds the second threshold, the management system 3 gives notification (S10). Moreover, when the magnitude of the difference ΔT exceeds the first threshold ΔTh, the management system 3 transmits a calibration instruction signal to the electric tool 1 (S11) to cause the electric tool 1 to perform the calibration (S12).

As described above, in the electric tool system 10 of the present embodiment, the controller 52 (the association processor F1) performs the association process of associating the first torque measured value and the second torque measured value with each other. This enables the electric tool system 10 not only to grasp the condition of the electric tool 1 with reference to the first torque measured value corresponding to the measurement result by the electric tool 1 but also to determine, based on the second torque measured value, whether or not the first torque measured value is correct. In this case, the reliability of the tightening torque value measured by the electric tool 1 can be improved more than in the case where the tightening torque value is obtained based on only the measurement result by the electric tool 1.

Moreover, in the electric tool system 10 of the present embodiment, the controller 52 (the history generator F2) stores the history of use of the electric tool 1 in association with the inspection history. Thus, for example, when the actual usage (e.g., the frequency of use, the speed of the motor 111, used hours, the remaining life of the storage battery of the power source 16) of the electric tool 1 is stored in the controller 13 or the like of the electric tool 1, a comparison between the usage of the electric tool 1 and the inspection result by the inspection device 2 provides, for example, the relationship between the usage of the electric tool 1 and the deterioration speed.

Moreover, in the electric tool system 10 of the present embodiment, the controller 52 (the calibration processor F4) calibrates the electric tool 1 with reference to the result of the comparison between the first torque measured value and the second torque measured value. This enables the reliability of the tightening torque value measured by the electric tool 1 to be further improved. Note that the controller 52 (the calibration processor F4) may calibrate the electric tool 1 each time the inspection device 2 inspects the electric tool 1.

(3) Variations

The embodiment described above is merely an example of various embodiments of the present disclosure. The embodiment described above may be modified in various ways depending on design and the like as long as the object of the present disclosure is achieved. Moreover, a function similar to the management system 3 of the electric tool system 10 may be implemented by a management method, a (computer) program, a non-transitory storage medium in which a program is recorded, or the like.

A method for managing the electric tool 1 according to an aspect is a managing method of the electric tool 1 including: the tightening unit 11 configured to tighten a workpiece onto an attaching target by driving force of a drive source (the motor 111); and the sensor 12 configured to measure a tightening torque provided by the tightening unit 11. The management method includes: a measurement step of measuring tightening force applied from the tightening unit 11; and an association step of associating a first torque measured value to a second torque measured value. The first torque measured value corresponds to a measurement result by the sensor 12. The second torque measured value corresponds to a measurement result in the measurement step. Moreover, a program according to one aspect causes one or more processors (e.g., the controller 22 of the inspection device 2 and the controller 52 of the server 5) to execute the management method.

Variations of the embodiment described above will be described below. Note that any of the variations to be described below may be combined as appropriate. In the following description, the embodiment described above will be hereinafter sometimes referred to as a "basic example".

(3.1) First Variation

An electric tool system 10 of a first variation will be described with reference to FIG. 7.

Figure 7:
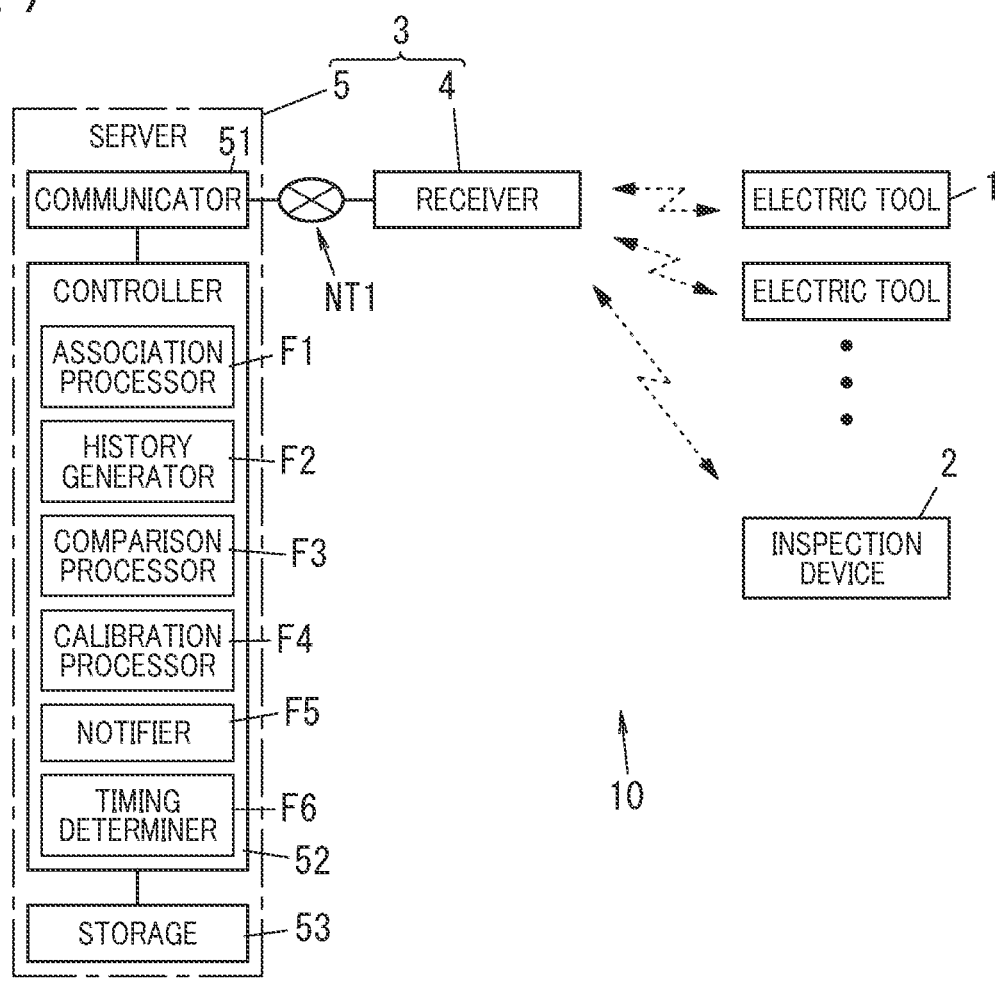
FIG. 7 is a block diagram of a schematic configuration of an electric tool system of a first variation.

As shown in FIG. 7, the electric tool system 10 of the present variation includes: a plurality of electric tools 1; and a management system 3 including a receiver 4 configured to communicate with the plurality of electric tools 1. Each of the plurality of electric tools 1 has the same configuration in this variation. Note that the plurality of electric tools 1 have different pieces of identification information (e.g., identification numbers) for distinguishing themselves from each other. Moreover, a controller 52 of the present variation further includes a timing determiner F6 as shown in FIG. 7.

In the present variation, each electric tool 1 includes its identification information into a first measurement signal representing a first torque measured value and transmits the first measurement signal. Moreover, when the controller 52 of a server 5 receives the first measurement signal via the receiver 4, the controller 52 determines, based on the identification information included in the first measurement signal, the transmission source of the first measurement signal from among the plurality of electric tools 1. Moreover, the controller 52 stores, in a storage 53, the first torque measured value included in the first measurement signal whose transmission source is thus determined, in a distinguished manner for each piece of identification information (i.e., each electric tool 1).

Moreover, when an association processor F1 of the controller 52 receives a second measurement signal including a second torque measured value from an inspection device 2 via the receiver 4, the association processor F1 associates the second torque measured value with the identification information of the electric tool 1 transmitting the first measurement signal at that time and the first torque measured value included in the first measurement signal. The controller 52 stores the first torque measured value and the second torque measured value thus associated with each other in the storage 53 in association with the identification information.

The timing determiner F6 determines, based on the inspection history (the histories of the first and second torque measured values) and the history of use (the history of the first torque measured value) of one electric tool 1 and the history of use (the history of the first torque measured value) of another electric tool 1, a calibration timing of the another electric tool 1.

Specifically, when the controller 52 (the timing determiner F6) determines, based on the inspection history of one electric tool 1, that the one electric tool 1 has to be calibrated, the controller 52 also determines that another electric tool 1 whose usage (e.g., used hours) is similar to that of the one electric tool 1 has to be calibrated. For example, when it is determined, based on the inspection history of an electric tool 1 (hereinafter referred to as a "first electric tool"), that the first electric tool has to be calibrated, the total used hours of the first electric tool is assumed to be 1000 hours. In this case, the controller 52 determines, at a time point at which the total used hours of another electric tool (hereinafter also referred to as a "second electric tool") reaches 1000 hours, that the second electric tool has to be calibrated. Then, the controller 52 transmits a notification signal representing that the second electric tool has to be calibrated from a communicator 51 to the receiver 4 or the like.

As described above, in the electric tool system 10 of the present variation, simply inspecting one electric tool 1 of the plurality of electric tools 1 enables the calibration timing of another electric tool 1 of the plurality of electric tools 1 to be determined. Thus, the reliability of the tightening torque value measured by the electric tool 1 (the another electric tool 1) can be improved.

(3.2) Second Variation

An electric tool system 10 of a second variation will be described with reference to FIG. 8.

Figure 8:
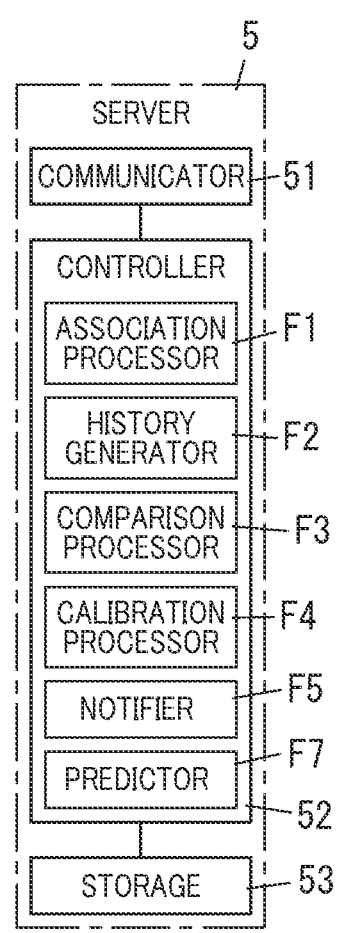
FIG. 8 is a block diagram of a schematic configuration of a server of a management system included in an electric tool system of a second variation.

As shown in FIG. 8, in the electric tool system 10 of the present variation, a controller 52 of a server 5 includes a predictor F7 configured to predict the occurrence of a defect such as a failure or age deterioration in an electric tool 1.

The predictor F7 predicts the occurrence of the failure in the electric tool 1 with reference to a learned model in this variation. The learned model is designed to output, in response to a given input (a first torque measured value and a second torque measured value), the probability of the occurrence of the failure in the electric tool 1. The learned model is generated by a machine learning algorithm based on a certain amount or more of learning data. The learning data may be prepared in advance or may be generated from data transmitted from a receiver 4. The predictor F7 gives the input obtained from the receiver 4 to the learned model, and based on a state value (probability) obtained from the learned model in response to the input, the predictor F7 predicts the occurrence of the failure in the electric tool 1. Such a learned model may be generated through supervised learning based on learning data (data set) defining the relationships of the first torque measured value and the second torque measured value to the probability of the occurrence of a failure. The learned model is stored in, for example, a storage 53.

As described above, in the electric tool system 10 of the present variation, the predictor F7 predicts the occurrence of a failure in the electric tool 1. This enables the reliability of the electric tool 1 to be improved.

Note that what the predictor F7 predicts is not limited to the failure in the electric tool 1 but may be, for example, the occurrence of a failure in, such as unsatisfactory tightening of, a workpiece on which the electric tool 1 works.

(3.3) Third Variation

An electric tool system 10 of a third variation will be described with reference to FIG. 9.

Figure 9:
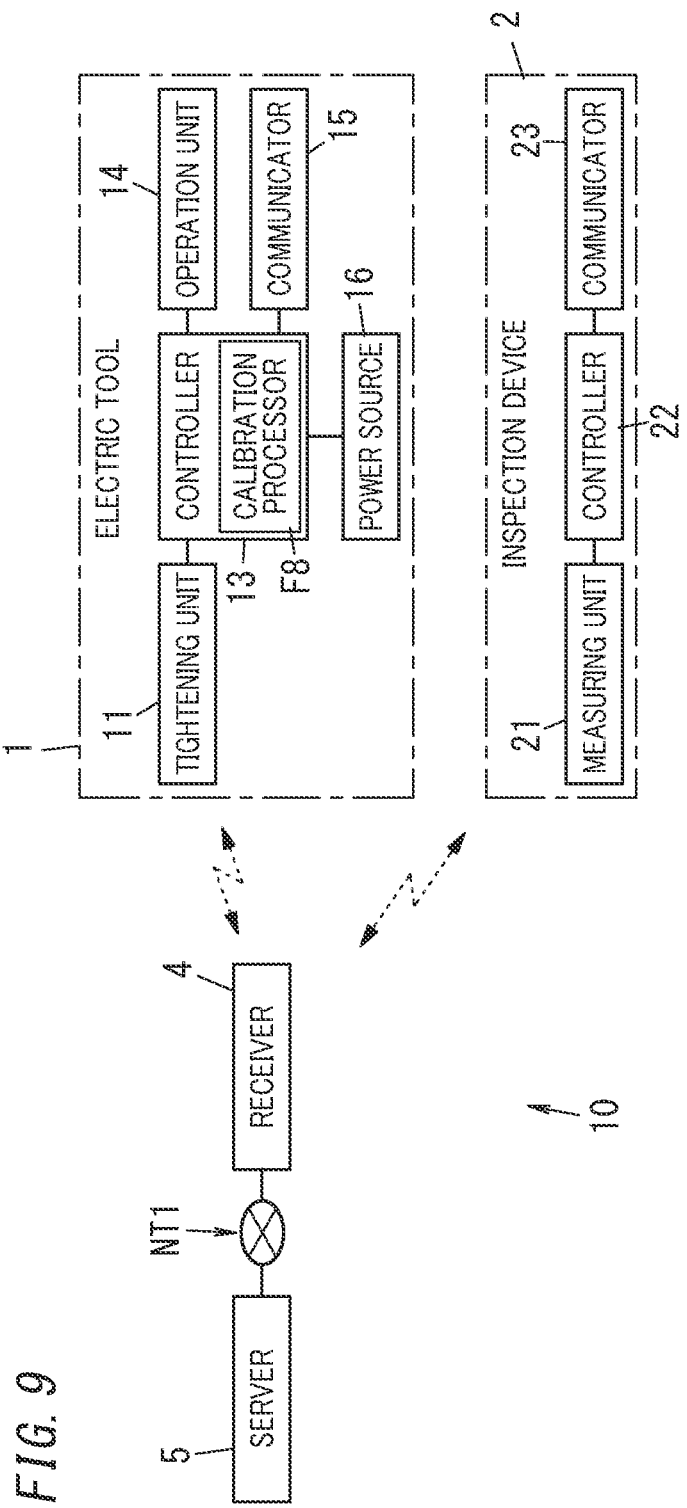
FIG. 9 is a block diagram of a schematic configuration of an electric tool system of a third variation.

As shown in FIG. 9, the electric tool system 10 of the present variation includes an electric tool 1 provided with no sensor 12. In contrast, the electric tool 1 includes a controller 13 provided with a calibration processor F8. The controller 13 further includes a torque estimation unit. The torque estimation unit estimates an output torque output from an output shaft 113. The torque estimation unit estimates the magnitude of the output torque with reference to the rotational speed, a change in the rotation amount of the motor 111, and the like between the impacts made by an impact mechanism 112. The controller 13 stops the rotation of a motor 111 when the output torque thus estimated reaches a torque set value.

As shown in FIG. 9, the electric tool 1 includes: a tightening unit 11 configured to tighten a workpiece onto an attaching target by driving force of a drive source (the motor 111); and the controller 13 configured to control the tightening unit 11 so as to adjust the output torque to be output from the tightening unit 11. Moreover, an inspection device 2 includes a measuring unit 21 configured to measure tightening force applied from the tightening unit 11. The calibration processor F8 of the electric tool 1 calibrates the controller 13 in accordance with a measured value measured by the measuring unit 21 of the inspection device 2.

More specifically, when the measured value (the tightening force or an applied tightening torque value) reaches a prescribed target value at the time of inspection of the electric tool 1, the inspection device 2 transmits a calibration instruction signal via a receiver 4 to the electric tool 1. The calibration instruction signal is a signal representing a current applied tightening torque value (a second torque measured value). The calibration processor F8 of the electric tool 1 calibrates, based on the second torque measured value included in the calibration instruction signal thus received, the output torque estimated by the torque estimation unit (such that the magnitude of the output torque thus estimated approximates a torque value represented by the calibration instruction signal).

This enables, also in the electric tool system 10 of the present variation, the reliability of the tightening torque value measured by the electric tool 1 to be improved.

Note that functions similar to those of the calibration processor F8 of the present variation may be implemented by a management method, a (computer) program, a non-transitory storage medium in which a program is recorded, or the like. A method for managing the electric tool 1 according to an aspect is a management method of an electric tool 1 including: the tightening unit 11 configured to tighten a workpiece onto an attaching target by driving force of a drive source (the motor 111); and the controller 13 configured to control the tightening unit 11 so as to adjust the output torque to be output from the tightening unit 11. The management method includes: a measurement step of measuring tightening force applied from the tightening unit 11; and a calibration step of calibrating the controller 13 with reference to a measured value measured in the measurement step. Moreover, a program according to an aspect causes one or more processors (e.g., the controller 13 of the electric tool 1 and a controller 22 of the inspection device 2) to execute the management method.

Note that the present variation does not have to include the management system 3 (the receiver 4 and the server 5) as long as communication is possible between the electric tool 1 and the inspection device 2.

(3.4) Other Variations

The electric tool system 10 described above includes a computer systems in, for example, the controllers 13, 22, 43, and 52. The computer system includes a processor and memory as hardware components. The processor executes a program stored in the memory of the computer system, thereby realizing functions as the controllers 13, 22, 43, and 52 in the present disclosure. The program may be stored in the memory of the computer system in advance or may be provided over a telecommunications network. Alternatively, the program may also be distributed after having been recorded in some non-transitory storage medium such as a memory card, an optical disc, or a hard disk drive, any of which is readable for the computer system. The processor of the computer system includes one or more electronic circuits including a semiconductor integrated circuit (IC) or a large-scale integrated circuit (LSI). The integrated circuit such as IC or LSI mentioned herein may be referred to in another way, depending on the degree of the integration and may be integrated circuits called system LSI, very-large-scale integration (VLSI), or ultra-large-scale integration (ULSI). A field programmable gate array (FGPA), which is programmable after fabrication of the LSI, or a reconfigurable logical device which allows reconfiguration of connections in LSI or setup of circuit cells in LSI may be used for the same purpose. The plurality of electronic circuits may be collected on one chip or may be distributed on a plurality of chips. The plurality of chips may be collected in one device or may be distributed in a plurality of devices.

In one variation, association of the first torque measured value with the measurement time and association of the second torque measured value with the measurement time may be performed by a component other than the controller 43 of the receiver 4, and may be performed by, for example, the controller 52 of the server 5. For example, when receiving a signal including the first torque measured value (or the second torque measured value) from the receiver 4, the controller 52 associates the time, at which the signal is received by the controller 52, as the measurement time with the first torque measured value (or the second torque measured value).

In one variation, the first measurement signal may be a signal which represents the first torque measured value and a time (measurement time) in association with each other, the time (measurement time) being a time counted by a clock unit provided in the electric tool 1 when the torque is measured by the sensor 12. Moreover, the second measurement signal may be a signal which represents the second torque measured value and a time (measurement time) in association with each other, the time (measurement time) being a time counted by a clock unit provided in the inspection device 2 when the tightening force is measured by the measuring unit 21.

In one variation, in the electric tool system 10 including the plurality of electric tools 1, the controller 52 may determine a failure in the inspection device 2. For example, when the difference ΔT between the average value of the first torque measured values of the plurality of electric tools 1 and the second torque measured value by the inspection device 2 is greater than the threshold, the controller 52 may determine that a failure is in the inspection device 2. Alternatively, the plurality of electric tools 1 are inspected, and if the second torque measured value by the inspection device 2 is greater (or less) than each of the first torque measured values for the inspections of all the electric tools 1, the controller 52 may determine that a failure is in the inspection device 2. Then, the controller 52 (the calibration processor F4) may calibrate, based on a result of the comparison made by the comparison processor F3, the inspection device 2 such that the difference ΔT between the first torque measured value and the second torque measured value decreases.

In one variation, communication may be possible between the electric tool 1 and the inspection device 2. In this case, the receiver 4 is configured to communicate at least one of the electric tool 1 or the inspection device 2.

In one variation, the management system 3 does not have to include the server 5. In this case, components (the association processor F1, the history generator F2, the comparison processor F3, the calibration processor F4, the notifier F5, the timing determiner F6, and the predictor F7) of the controller 52 of the server 5 in the management system 3 may be included in the receiver 4.

Figure 10:
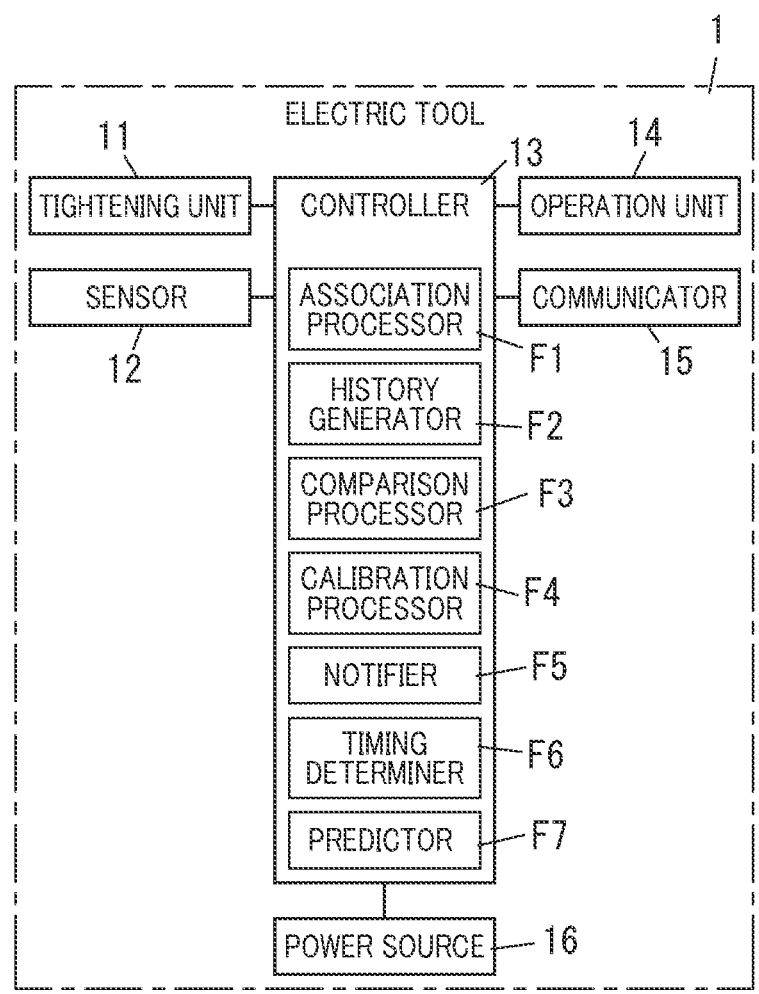
FIG. 10 is a block diagram of a schematic configuration of an electric tool included in an electric tool system of a variation.
Figure 11:
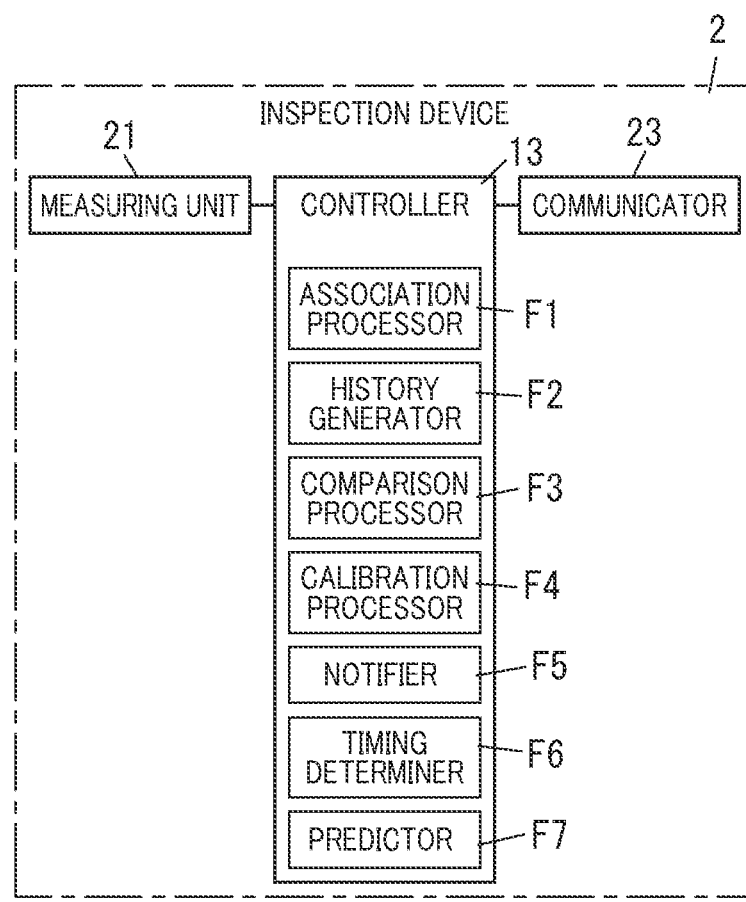
FIG. 11 is a block diagram of a schematic configuration of an inspection device included in an electric tool system of a variation.

In one variation, the electric tool system 10 does not have to include the management system 3. In this case, components (the association processor F1, the history generator F2, the comparison processor F3, the calibration processor F4, the notifier F5, the timing determiner F6, the predictor F7, and the like) of the controller 52 of the server 5 in the management system 3 may be included in the electric tool 1 as shown in FIG. 10 or may be included in the inspection device 2 as shown in FIG. 11.

In one variation, the receiver 4 may be an information terminal carried by a user who uses the electric tool 1.

In one variation, the controller 52 may include only one of the calibration processor F4 and the notifier F5 or does not have to include the calibration processor F4 or the notifier F5.

In one variation, a manufacturer of the electric tool 1 as a user of the server 5 may vary the guarantee for users of the electric tool 1 depending on an inspection frequency obtained from the inspection history. For example, for a user with a high inspection frequency, repair charge may be discounted at the time of repairing the electric tool 1.

(4) Aspects

Based on the embodiment and variations described above, the following aspects are disclosed.

An electric tool system (10) of a first aspect includes an electric tool (1) and an inspection device (2). The electric tool (1) includes: a tightening unit (11) configured to tighten a workpiece onto an attaching target by driving force of a drive source (the motor 111); and a sensor (12) configured to measure a tightening torque provided by the tightening unit (11). The inspection device (2) includes a measuring unit (21) configured to measure tightening force applied from the tightening unit (11). The electric tool system (10) further includes an association processor (F1) configured to associate a first torque measured value with a second torque measured value. The first torque measured value corresponds to a measurement result by the sensor (12). The second torque measured value corresponds to a measurement result by the measuring unit (21).

This aspect enables the reliability of a tightening torque value measured by the electric tool (1) to be improved.

An electric tool system (10) of a second aspect referring the first aspect further includes a management system (3) separated from the electric tool (1) and the inspection device (2), the management system (3) being configured to communicate with at least one of the electric tool (1) or the inspection device (2). The association processor (F1) is included in the management system (3).

This aspect enables the reliability of the tightening torque value measured by the electric tool (1) to be improved.

In an electric tool system (10) of a third aspect referring the first aspect, the association processor (F1) is included in at least one of the electric tool (1) or the inspection device (2).

This aspect enables the reliability of the tightening torque value measured by the electric tool (1) to be improved.

An electric tool system (10) of a fourth aspect referring to any one of the first to third aspects further includes a history generator (F2). The history generator (F2) is configured to generate an inspection history with the second torque measured value being associated with the first torque measured value in time sequence.

This configuration allows an administrator of the electric tool system (10) to use the inspection history of the electric tool (1).

In an electric tool system (10) of a fifth aspect referring the fourth aspect, the history generator (F2) is configured to further associate a history of use of the electric tool (1) with the inspection history.

This aspect allows the administrator of the electric tool system (10) to use the inspection history associated with the history of use of the electric tool (1).

An electric tool system (10) of a sixth aspect referring to any one of the first to fifth aspects further includes a comparison processor (F3) configured to make a comparison between the first torque measured value and the second torque measured value.

This aspect enables the reliability of the tightening torque value measured by the electric tool (1) to be improved.

An electric tool system (10) of a seventh aspect referring the sixth aspect further includes a calibration processor (F4) configured to calibrate, based on a result of the comparison made by the comparison processor (F3), the electric tool (1) or the inspection device (2) such that a difference (ΔT) between the first torque measured value and the second torque measured value decreases.

This aspect enables the reliability of the tightening torque value measured by the electric tool (1) to be improved.

An electric tool system (10) of an eighth aspect referring the sixth or seventh aspect further includes a notifier (F5) configured to give notification with reference to the result of the comparison made by the comparison processor (F3).

This aspect enables the reliability of the tightening torque value measured by the electric tool (1) to be improved.

An electric tool system (10) of a ninth aspect includes an electric tool (1) and an inspection device (2). the electric tool (1) includes a tightening unit (11) configured to tighten a workpiece onto an attaching target by driving force of a drive source (the motor 111) and a controller (13) configured to control the tightening unit (11) so as to adjust an output torque to be output from the tightening unit (11). The inspection device (2) includes a measuring unit (21) configured to measure tightening force applied from the tightening unit (11). The electric tool (1) further includes a calibration processor (F8) configured to calibrate the controller (13) in accordance with a measured value measured by the measuring unit (21) of the inspection device (2).

This aspect enables the reliability of the tightening torque value measured by the electric tool (1) to be improved.

In an electric tool system (10) of a tenth aspect referring the ninth aspect, the calibration processor (F8) is configured to perform calibration such that the output torque approximates a torque value corresponding to the measured value with the measured value reaching a prescribed target value as being a trigger.

This aspect enables the reliability of the tightening torque value measured by the electric tool (1) to be improved.

An electric tool (1) of an eleventh aspect is the electric tool (1) included in the electric tool system (10) of any one of the first to tenth aspects.

A management method of an electric tool (1) of a twelfth aspect is a management method of an electric tool (1) including: a tightening unit (11) configured to tighten a workpiece onto an attaching target by driving force of a drive source (the motor 111); and a sensor (12) configured to measure a tightening torque provided by the tightening unit (11). The management method includes: a measurement step of measuring tightening force applied from the tightening unit (11); and an association step of associating a first torque measured value to a second torque measured value. The first torque measured value corresponds to a measurement result by the sensor (12). The second torque measured value corresponds to a measurement result in the measurement step.

This aspect enables the reliability of the tightening torque value measured by the electric tool (1) to be improved.

The management method of an electric tool (1) of a thirteenth aspect is a management method of an electric tool (1) including a tightening unit (11) configured to tighten a workpiece onto an attaching target by driving force of a drive source (the motor 111) and a controller (13) configured to control the tightening unit (11) so as to adjust an output torque to be output from the tightening unit (11)). The management method includes: a measurement step of measuring tightening force applied from the tightening unit (11); and a calibration step of calibrating the controller (13) with reference to a measured value measured in the measurement step.

This aspect enables the reliability of the tightening torque value measured by the electric tool (1) to be improved.

REFERENCE SIGNS LIST

10 Electric Tool System
1 Electric Tool
11 Tightening Unit
111 Motor (Drive Source)
12 Sensor
13 Controller
2 Inspection Device
21 Measuring unit
3 Management System
F1 Association Processor
F2 History Generator
F3 Comparison Processor
F4, F8 Calibration Processor
F5 Notifier
ΔT Difference

The invention claimed is:

1. An electric tool system, comprising:
an electric tool including
a tightening unit configured to tighten a workpiece onto an attaching target by driving force of a motor, and
a controller configured to control the tightening unit so as to adjust an output torque to be output from an output shaft of the tightening unit, the controller including a torque estimation unit configured to estimate the output torque output from the output shaft with reference to a rotational speed and a change in a rotation amount of the motor, the controller being configured to stop rotation of the motor when the output torque estimated by the torque estimation unit reaches a torque set value; and
an inspection device including a measuring unit configured to measure a tightening torque value applied from the tightening unit, the inspection device being configured to, when a measured value of the tightening torque value measured by the measuring unit reaches a prescribed target value under inspection of the electric tool, transmit, to the electric tool, a calibration instruction signal representing a measured value of a tightening torque value currently applied, wherein:
the electric tool further includes a calibration processor configured to calibrate the controller in accordance with the measured value measured by the measuring unit of the inspection device, and
the calibration processor is configured to calibrate, based on the tightening torque value included in the calibration instruction signal, the output torque estimated by the torque estimation unit such that the magnitude of the output torque thus estimated approximates the tightening torque value represented by the calibration instruction signal.

2. The electric tool system of claim 1, wherein the calibration processor is configured to perform calibration such that the output torque approximates a torque value corresponding to the measured value with the measured value reaching a prescribed target value as being a trigger.

3. A method for managing an electric tool, the electric tool including:
a tightening unit configured to tighten a workpiece onto an attaching target by driving force of a motor; and
a controller configured to control the tightening unit so as to adjust an output torque to be output from an output shaft of the tightening unit, the controller including a torque estimation unit configured to estimate the output torque output from the output shaft with reference to a rotational speed and a change in a rotation amount of the motor, the controller being configured to stop rotation of the motor when the output torque estimated by the torque estimation unit reaches a torque set value,
the method comprising:
measuring, by an inspection device, tightening force applied from the tightening unit, the measuring including transmitting, when a measured value of the tightening force measured in a step of measuring tightening force reaches a prescribed target value while inspection of the electric tool is performed, a calibration instruction signal representing a current measured value to the electric tool; and
calibrating the controller with reference to a measured value measured in the step of measuring tightening force, the calibrating including calibrating, based on the measured value included in the calibration instruction signal, the output torque estimated by the torque estimation unit such that the magnitude of the output torque thus estimated approximates a torque value represented by the calibration instruction signal.

* * * * *